United States Patent [19]

Tomita et al.

[11] 4,239,379

[45] Dec. 16, 1980

[54] METHOD AND APPARATUS FOR SCAN-PHOTOGRAPHING A SUBJECT SUCH AS A MODEL

[75] Inventors: Yukio Tomita, Osaka; Taketaro Nishio, Hiroshima, both of Japan

[73] Assignees: Hitachi Shipbuilding & Engineering Co., Ltd.; Dainippon Screen Mfg. Co., Ltd., both of Japan

[21] Appl. No.: 884,635

[22] Filed: Mar. 8, 1978

[30] Foreign Application Priority Data

Mar. 26, 1977 [JP] Japan .................................. 52/33788

[51] Int. Cl.$^3$ ............................................. G03B 27/68
[52] U.S. Cl. ......................................... 355/52; 355/77
[58] Field of Search ..................... 355/52, 51, 77, 66

[56] References Cited

U.S. PATENT DOCUMENTS 3,289,528   12/1966   Petreycik .......................... 355/52 X Primary Examiner—Richard A. Wintercorn
Attorney, Agent, or Firm—Birch, Stewart, Kolasch & Birch

[57] ABSTRACT

The present inventions directed to a method and apparatus of scan-photographing a subject such as a model, in which a three-dimensional subject having a depth such as a model is projected on a sensitive film while being scanned through an optical system having a lens and a slit integrally incorporated therein, and the subject is then photographed in a plan view (hereinafter referred to as orthographically projected photograph) at a predetermined photographing magnification without being effected by the view angle of the lens, while the subject and the sensitive film are travelled in parallel with and in the opposite direction to each other at predetermined speeds, respectively.

11 Claims, 16 Drawing Figures

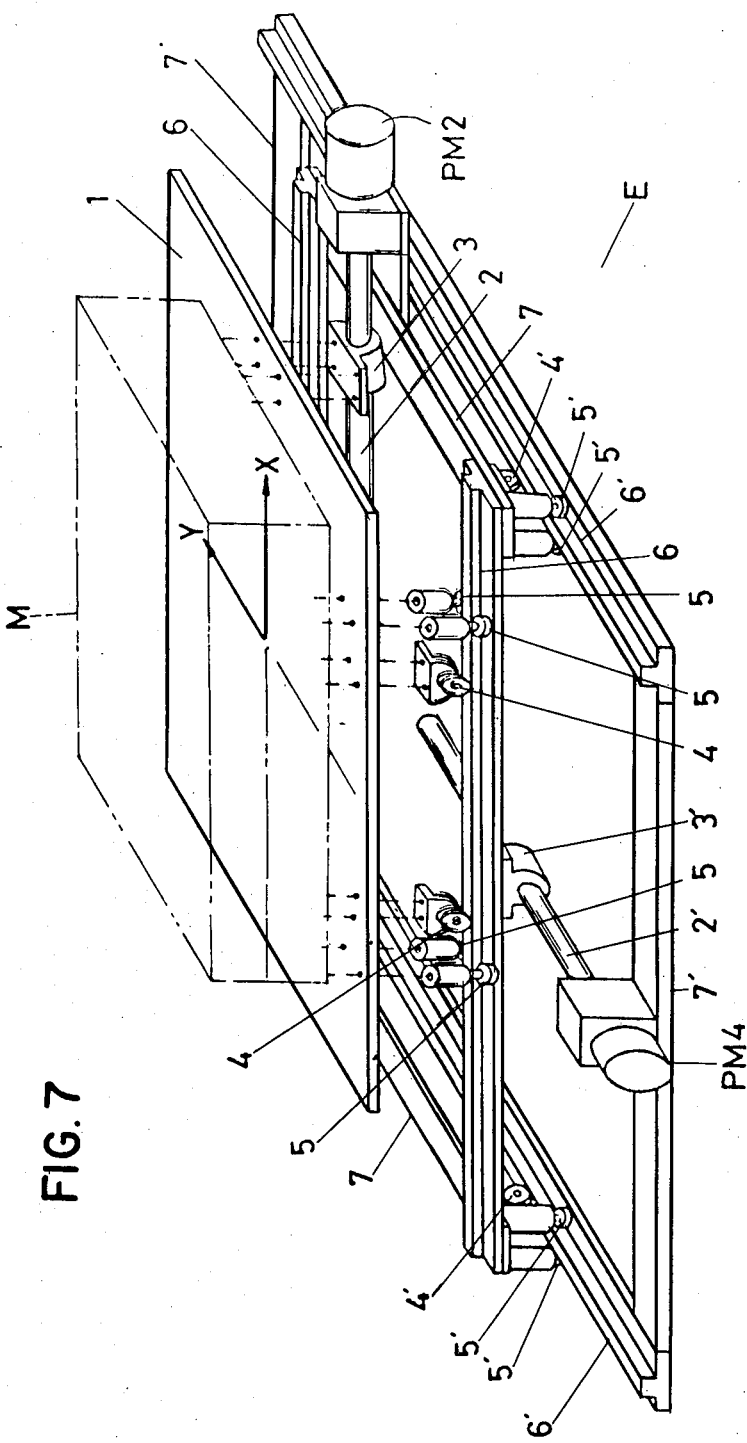

4,239,379

METHOD AND APPARATUS FOR SCAN-PHOTOGRAPHING A SUBJECT SUCH AS A MODEL

BACKGROUND OF THE INVENTION

The present invention relates to taking a photograph in a plan view of a three-dimensional subject having a depth such as a model without being effected by the view angle of a lens.

DESCRIPTION OF PRIOR ARTS

A photograph in which the effect due to the viewing angle of a lens is reduced, has conventionally been obtained by dividing a subject into a predetermined number of portions, photographing all of the divided portions by means of a camera, joining together reversed negatives or printed photographic papers and thereafter photographing the combined whole negatives or photographic papers, thereby to producing one photograph.

The method used in the prior art has disadvantages that in complicated procedures are required for composing a large number of negatives or photographic papers, there is a necessity to photograph the whole image again, and distortion of the image may be produced due to the large angle of the viewing at the seams of each of the divided portions. In addition, there may be an occurrence of irregular density at composition when printing each of the divided negatives, if there was a variation in exposure.

SUMMARY OF THE INVENTION

It is an object of the present invention to considerably reduce the angle of view at photographing thereby to produce no effect exerted by the angle of view and to deepen the depth of focus, by setting a predetermined photographing magnification and stop value.

It is another object of the present invention to project only an image of a finely divided portion of a subject through a slit and to continuously scan-photograph the subject on a sensitive film, thereby to produce an orthographically projected photograph of a three dimensional subject such as models.

It is further object of the present invention to completely eliminate composition work of negatives or printing papers.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein;

FIG. 7 is a perspective view with portions disassembled of a subject travelling device shown in FIG. 5;

FIG. 8(a) and (b) are photographs, showing the photographed results, (a) being a plane photograph in which synchronous scanning has not been properly utilized and (b) being a plane photograph in which synchronous scanning has been properly utilized;

DETAILED DESCRIPTION OF THE PREFERRED EMBODIMENTS

Figure 1:
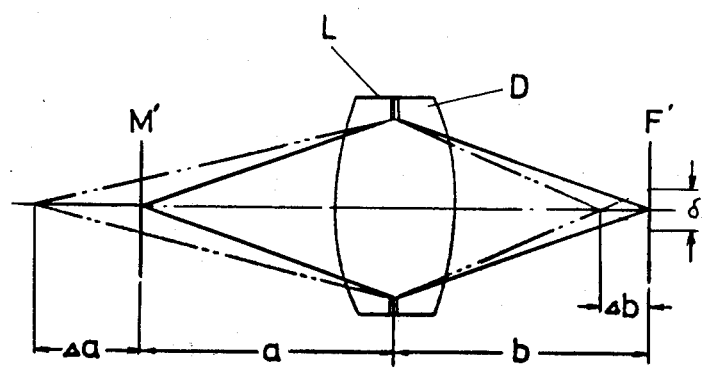
FIG. 1 is a principle diagram of an optical system showing the relation between depth of focus and defocus.
Figure 2:
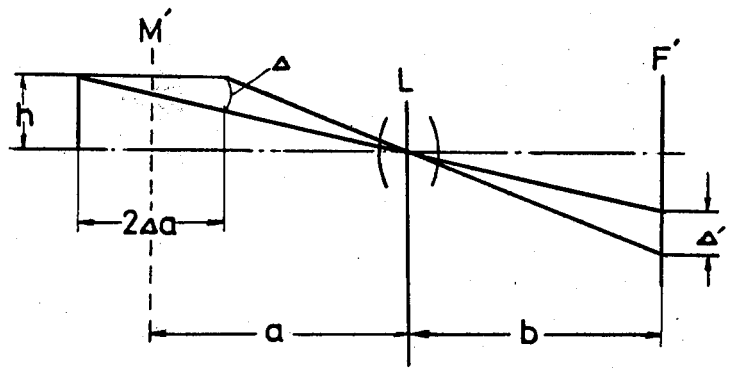
FIG. 2 is a principle diagram of the optical system showing a dimensional variation of an image with respect to the angle of view.
Figure 3:
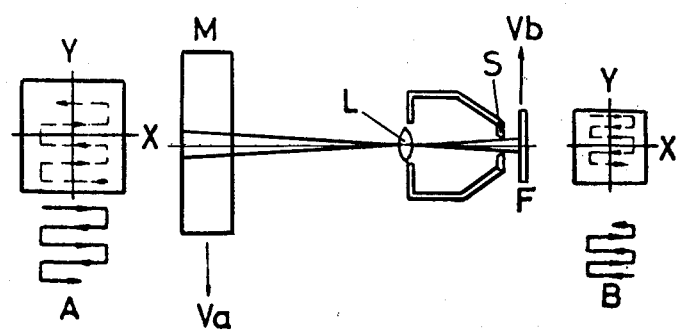
FIG. 3 is a diagram of the principle in which a subject and a sensitive film are synchronously scanned with respect to a lens and a slit, so as to produce an orthographically projected photograph, A and B therein being front views showing travelling modes of the subject and the sensitive film, respectively.

Referring now to FIGS. 1 to 3, the following description is provided of the method and apparatus of scan-photographing subjects such as models in accordance with the present invention.

In FIG. 1 which is a principle diagram of the optical system showing the relation between a depth of focus and defocus, a lens is generally designated by L, an iris diaphragm by D, a center plane of a subject M by M', and a sensitive film plane or focus plane of a sensitive film F by F'.

Generally, when the depth of subject M is $\pm \Delta a$, defocus $\Delta b$ is shown as follows;

$$\Delta b = \mp \Delta a \, m^2 \tag{1}$$

where m is photographing magnification, and m may be expressed as $m = b/a$, where a is a distance from the lens center to the center plane M' and b is a distance from the lens center to the film plane F'.

Focus depth of a lens $\Delta b'$ is shown as follows;

$$\Delta b' = \delta(m+1) F_{NO} \tag{2}$$

where $\delta$ is an allowable blur or a diameter of circle of scattering and $F_{NO}$ is a lens stop value.

Since defocus Δb should be within the range of the focus depth Δb', a necessary stop value $F_{NO}$ for a predetermined photographing magnification m will be determined when Δa and δ are given.

FIG. 2 is a principle diagram of the optical system showing the dimension of an image with respect to the angle of view where the depth of subject M is ±Δa. In FIG. 2, when using only near axis rays having h within the range obtained by the following equation;

$$h \leq \Delta.a + \Delta a/2 \cdot \Delta a \quad (3)$$

where h is the distance between the optical axis line and the most remote portion of the subject therefrom, it is possible to reduce the dimensional deviation Δ' in an image occurred by effect of a shift of picture angle Δ, to such an extent that no troubles will be expected in practice. In this sense, the equation (3) may determine the dimension of a slit in the optical system in the present invention.

FIG. 3 is a principle diagram showing that subject M and sensitive film F are synchronously scanned with respect to lens L and slit S, so as to produce an orthographically projected photograph. Namely, while subject M and sensitive film F are being synchronously scanned in opposite direction to each other, with respect to lens L and slit S integrally incorporated in the optical system, an orthographically projected photograph is taken of the image of subject M on the sensitive film F.

In FIG. 3, A and B show travelling modes of model M and sensitive film F in the course of synchronous scanning. When lens L is fixed, the right lower portion of subject M is disposed oppositely to lens L, and the left upper portion of sensitive film F is disposed oppositely to lens L. Subject M and sensitive film F are moved in parallel with and in the opposite direction to each other so that those positions of subject M and sensitive film F into which the chain line terminates in FIG. 3, may correspond to each other with respect to lens L. Namely, a first stair of the lower portion of subject M may be photographed on a first stair of the upper portion of sensitive film F, while moving subject M in the right direction at a predetermined speed and sensitive film F in the left direction at a predetermined speed, as shown by solid lines in FIG. 3. Then, a second stair of subject M may be photographed, while travelling down subject M by such a distance as corresponding to the vertical distance of slit S and travelling up sensitive film F in such a distance as corresponding to the vertical distance of slit S, and such operation will be repeated thereafter.

Description will be then made of the subject M and sensitive film F scanning speeds in the horizontal direction (X direction). When photographing magnification m is b/a, the ratio of the film travelling speed Vb to the subject travelling speed Va may be determined by the following equation;

$$Vb/Va = m \quad (4)$$

Thus, an orthographically projected photograph of subject M having a depth may be taken on one sensitive film F.

Figure 4:
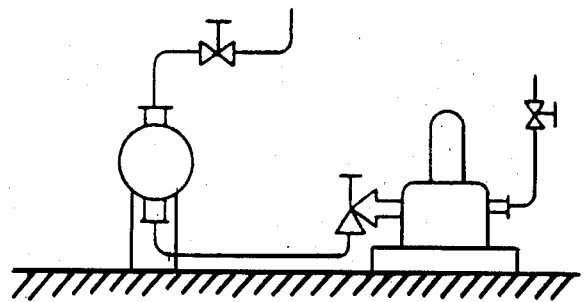
FIG. 4 is a front view of one example of a model.

Concerning subject M, as shown in FIG. 4 in the case of a shipping design, a model may be used in which all the apparatus, devices, piping and fittings in the inside of an engine room have been manufactured and assembled on a scale of 1 to 10 - 1 to 20 based on the preliminary layout drawing of the engine room. The model is photographed at a predetermined scale as provided by photographic magnification in such a manner as described in the foregoing, thus producing a negative. From the thus produced negative, a positive having dimensions of 1/10 to 1/20 of the actual dimensions of a ship may be produced. Such positive, when dimensions and marks are put down thereon, may be used as an original for drawings for working or mounting pipings and fittings, thereby to provide rationalization in designing of an engine room plant in which various kinds of apparatus and pipings are complexly disposed. This method may also be applied for designing various kinds of land-base plants.

The present invention will be further described in more detail with reference to FIGS. 5-15.

Figure 5:
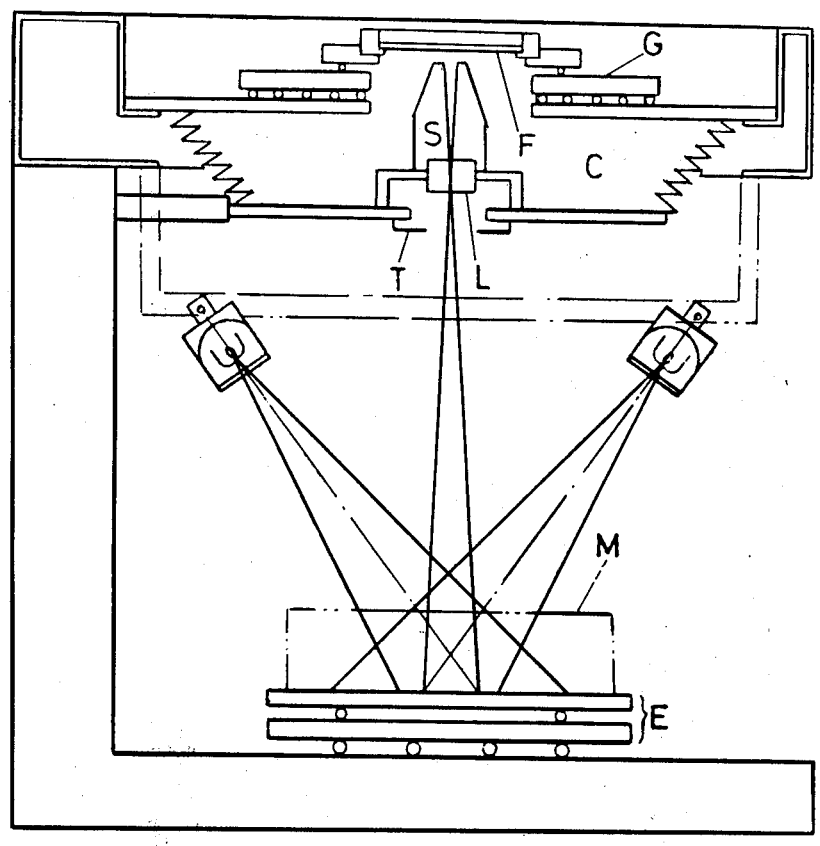
FIG. 5 is a partially broken side view of an embodiment of a scan-photographing apparatus in accordance with the present invention.

In FIG. 5 illustrates a general arrangement, camera C is disposed in parallel with subject M, and a sensitive film F is incorporated within camera C so as to be parallel with subject M. A lens L is supported in the camera C adjacent to the subject M. Subject M and sensitive film F are movably supported in the X and Y directions as shown by the full lines of A and B in FIG. 3, while each are retained at right angles to the optical axis of lens L by means of the moving devices E and G, respectively. In camera C lens L and slit S are provided, slit S is disposed at a position very close to film F. In addition, shutter T is provided at the lower portion of lens L. According to such an arrangement, only a finely divided portion of subject M is projected and photographed by light rays only adjacent the optical axis of lens L. Subject M and sensitive film F each synchronously scanned in the opposite direction to each other by means of moving devices E and G, so that subject M is scanned throughly. Thereby, reduced orthographically projected photographs of subject M may be obtained on sensitive film F.

Figure 6:
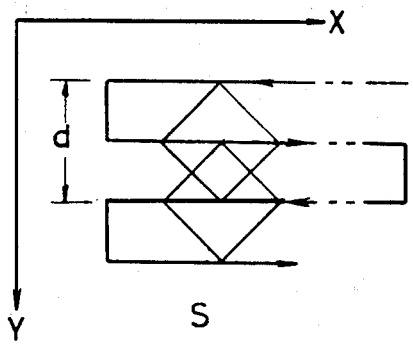
FIG. 6 is a diagram of the basis principal according to the present invention showing a relative travelling mode of the slit against film and/or subject.

The following description of the width, shape and relative travelling mode of slit S against film and/or subject will hereinafter be made with reference to FIG. 6.

The width of slit S may be determined dependent on the subject and sensitive film scanning speeds and the distance between slit S and the sensitive film F in accordance with the equation (3) abovementioned. The slit is preferably a diamond shape or a rectangle aperture which acts as a slit when moving. As shown in FIG. 6, slit or aperture S is moved in the Y direction by a half length of the Y-directional diagonal d of slit S so as to be moved in piles, thereby to produce orthographically projected photographs of constant density in which no scanning lines are prominent.

The following description of the subject moving device E will hereafter be made with reference to FIG. 7.

Moving device E is adapted to smoothly travel in the X and Y directions while placing subject M on a top plate 1 thereof. Travel in the X direction may be accomplished in such a way that a pulse motor PM2 rotates a driving screw 2, which will move a feed nut 3 fixed to the top plate 1. Four rollers 4 and eight side-rollers 5 disposed on the top plate 1 support the top plate 1 on rails 6, thus providing smooth movement and prevention of side movement of the top plate 1. Receiving plates 7 are provided at both ends of a pair of convex rails 6 correspondingly disposed to rollers 4, and said pulse motor PM2 is disposed on one of the receiving plates 7. Travel in the Y direction may also be smoothly accomplished by a pulse motor PM4, a driving screw 2', a feed nut 3', rollers 4', side-rollers 5', rails 6' and receiving plates 7'.

The sensitive film moving device G has, in principle, the same mechanism as that of said travelling device E.

Figure 9:
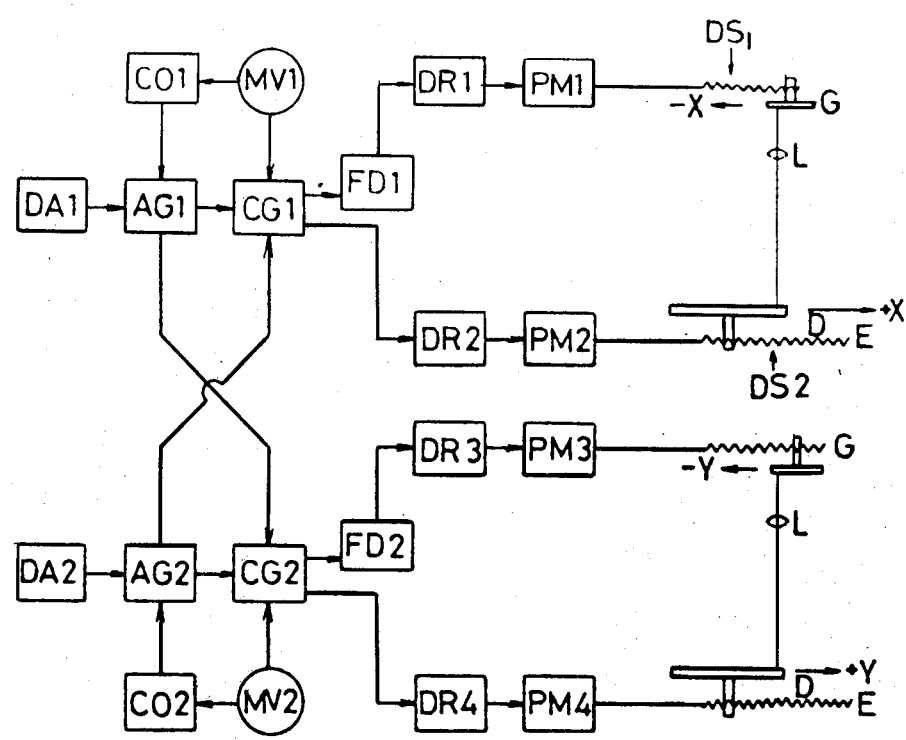
FIG. 9 is a block diagram of one example of a control device for controlling a synchronously scanning driving device in accordance with the present invention.
Figure 10:
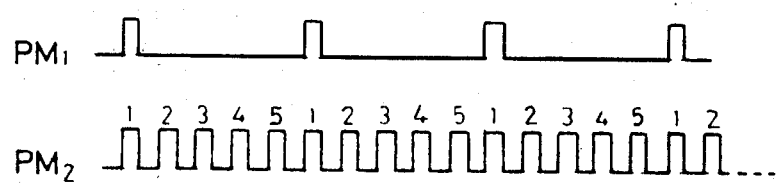
FIG. 10 is a diagram of a principle according to the present invention showing input pulses of a pulse motor used in the present invention.

The following description of the control mechanisms for moving devices E and G will thereafter be made with reference to FIGS. 8 to 10.

An orthographically projected picture may be produced by the composition of a number of scan-photographing operations. When subject M and sensitive film F are moved in parallel with and in the opposite directions to each other at predetermined speeds, respectively, there may be produced a difference $\Delta x$ as shown in FIG. 8(a), unless subject M and sensitive film F begin moving exactly at the same time and from predetermined portions thereof. This is same in the Y-direction, too; namely, unless the sensitive film F and the subject M are exactly moved by a distance determined by the width of slit or aperture S and photographing magnification difference of $\Delta Y$ or $-\Delta Y$, resulting in distortion of the image at each stage of scan-photographing. In such a case, there may subsequently be a difficulty in reading dimensions from orthographically projected photographs so as to permit the design and manufacture of the object photographed. In order to obtain normal orthographically projected photographs as shown in FIG. 8 (b), there must be provided a method to begin moving the sensitive film F and the subject M from predetermined points, respectively, and to synchronously scan and precisely feed the sensitive film F and the subject M.

Referring now to FIGS. 9 and 10, an X-directional travelling distance at a travel speed is set at a setting portion DA1. This preset X-directional travelling distance X is read in at a control gate circuit CG1 through a coincidence circuit AG1, thereby to the send to driving circuits DR1 and DR2 a necessary number of pulses generated by a pulse generator MV1, which correspond to a predetermined travelling distance. The pulses transmitted to the driving circuits DR1 and DR2 are amplified therein to drive pulse motors PM1 and PM2, which will in turn rotate driving screws DS1 and DS2 coupled thereto, thereby to move the sensitive film F and the subject M.

On the other hand, a counter CO1 counts the number of pulses being sent to the driving circuits DR1 and DR2, and coincidence circuit AG1 monitors the preset value and the counted number of pulses. When the counted number of pulses equals the preset value, the control gate circuit CG1 is adapted to the stop sending pulses to driving circuits DR1 and DR2, and give generates a completion signal of the X-directional travelling distance to the Y-directional travelling movement control gate circuit CG2. Then, the control gate circuit CG2 receives a completion signal of the X-directional travelling distance as a starting signal of the Y-directional travelling movement, and reads in the Y-directional travelling distance preset at the setting portion DA2, and subsequently the sensitive film F and subject M are moved by circuits for the Y-directional travelling movement arranged in a similar manner as those for the X-directional travelling movement.

The Y-directional travelling distance completion signal again enters the control gate circuit CG1 for the X-direction movement, thereby to switch the travelling direction to move the sensitive film F and subject M in the X-direction by the same preset travelling distance as that of the first time. Thereafter X- and Y-directional travelling movements are repeated, so that the subject M is thoroughly scanned, thus producing orthographically projected pictures.

A frequency divider FD1 is disposed between the control gate circuit CG1 and the driving circuit DR1 for suitably varying the sensitive film travelling amount corresponding to the subject travelling amount dependent on photographing magnification M. Since photographing magnification is limited only to a reduction in this embodiment, the frequency divider FD1 is disposed only at the side of the driving circuit DR1 for driving the sensitive film F. A frequency divider FD2 is also disposed only at the side of the film driving circuit DR3. Where photographing magnification m is 1/N (provided that N is a positive integer), the pulse motor PM2 is rotated upon reception of the pulses given from the control gate circuit CG1, as they are, but the pulse motor PM1 is rotated upon reception of pulses with frequency dividing ratio of 1/N.

The following is a description of the operation of the pulse motors PM1 and PM2. As shown in FIG. 10, the pulse motor PM1 is adapted to be driven by one pulse when the pulse motor PM2 is driven by the N number of pulses. However, the pulse motors PM1 and PM2 are not continuously driven, but pulse motors of the highest follow-up pulse speed (for example, about 16000 pulses/sec.) are used herein and feeding pitches of the sensitive film and subject driving screws are reduced to a small value, thereby providing the effect of synchronous scanning which is obtained in the case of continuous driving.

The description set forth hereinabove is directed to the embodiment in which the lens L and slit S are fixed and subject M and the sensitive film F are movable, however it will be of course the possible to arrange the device according to the present invention so that the subject M is fixed while the lens L with the slit S and the sensitive film F are movable, or so that the sensitive film F is fixed while the subject M and lens L with the slit S are movable.

Figure 11:
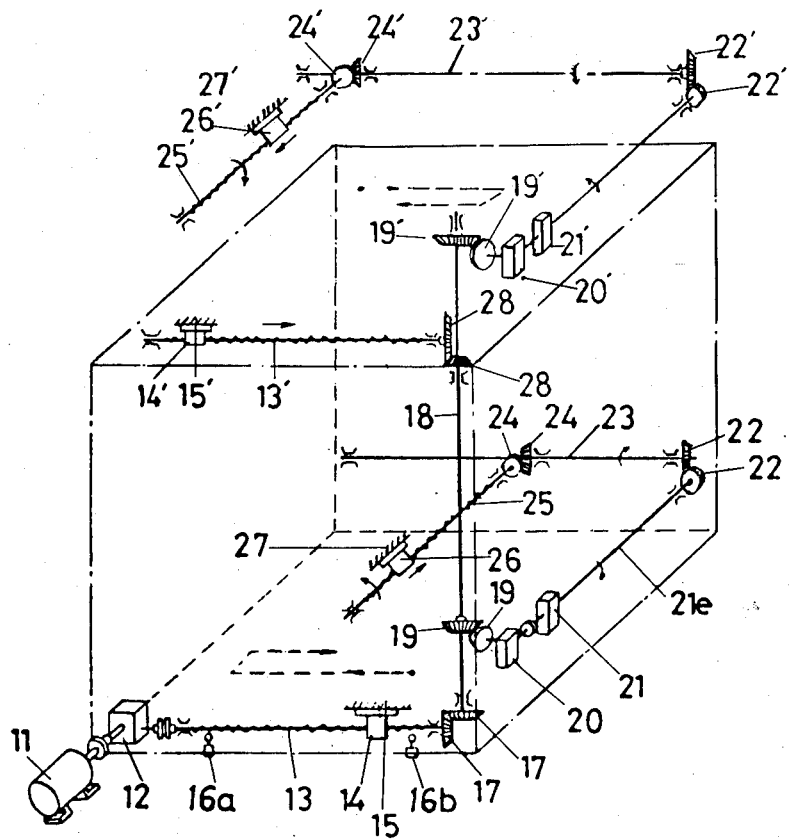
FIG. 11 is a view showing a transmission mechanism of another embodiment of a travelling device to be used in the present invention.
Figure 12:
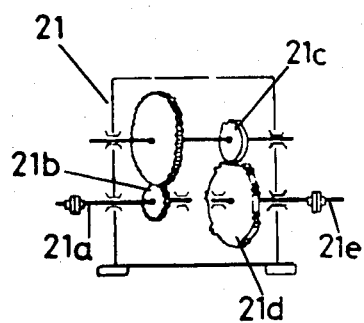
FIG. 12 is an explanatory view of a cam mechanism in FIG. 11.

The following description set forth hereinbelow is directed to another embodiment in accordance with the present invention with reference to FIGS. 11 to 15. In the moving device shown in FIG. 11, rotation of motor 11 such as an induction motor, hydraulic motor or an air motor, is transmitted to a transverse driving screw 13 through a first rotation reversing mechanism 12. Further, and a transverse feed receiving plate 15 is fixed to a feed nut 14 which is threadedly mounted to the driving screw 13. The driving screw 13 is provided at both ends thereof with limit switches 16a and 16b. The driving screw 13 is connected to a vertical shaft 18 through bevel gear 17 which is disposed at the tip of the driving screw 13. The vertical shaft 18 is connected to a second rotation reversing mechanism 20 through the bevel gear 19 which is disposed at the lower portion of the vertical shaft 18, and the second rotation reversing mechanism 20 is connected to an intermittent transmission cam mechanism 21. As shown in FIG. 12, an input shaft 21a of the cam mechanism 21 is communicated to a pinion 21C through a reduction mechanism 21b, and rotation of the pinion 21c is transmitted to an intermittently rotating gear wheel 21d. Thus, rotation of the continuously rotating input shaft 21a may provide the necessary intermittent rotation of a longitudinal output shaft 21e which is fixed to the gear wheel 21d. Rotation of the output shaft 21e is then transmitted to a transverse connecting shaft 23 through the bevel gears 22 disposed at the tip of the output shaft 21e, and is further transmitted to a longitudinal driving screw 25 through the bevel gears 24 disposed on the connecting shaft 23. A longitudinal feed receiving plate 27 is fixed to a feed nut 26 which is threadedly mounted to the driving screw 25, and a subject is adapted to be placed on the longitudinal feed receiving plate 27.

Operation of the moving device shown in FIG. 11 will hereinafter be described with reference to FIG. 14.

Figure 13:
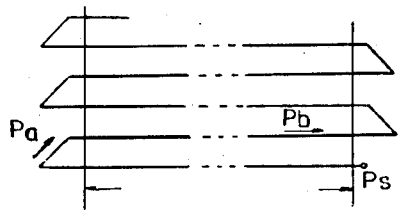
FIG. 13 shows a travelling locus of a subject in the present invention.
Figure 14:
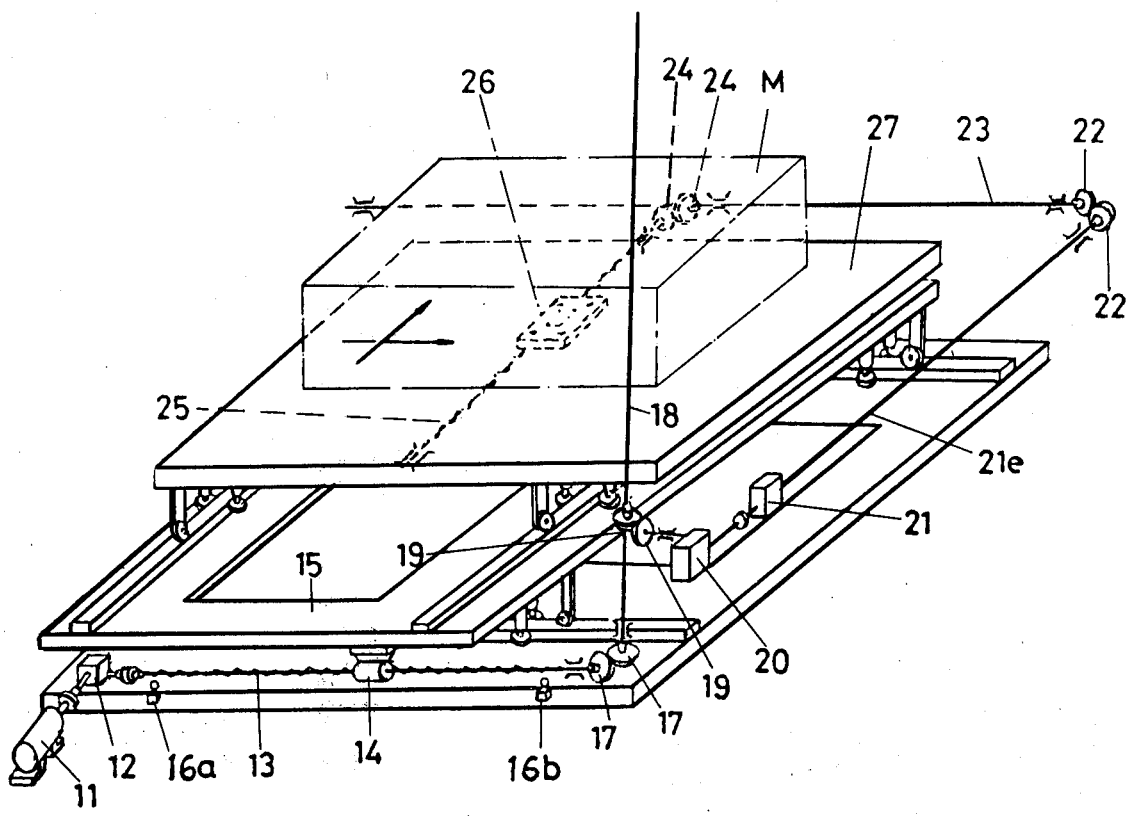
FIG. 14 is a perspective view of the travelling device of FIG. 11 in practice.

When a feed nut 14 is positioned at the right side of the transverse driving screw 13 as shown in FIG. 14, namely, at the starting position Ps in FIG. 13, rotation of the motor 11 imparts clockwise rotation to the driving screw 13 through the first rotation reversing mechanism 12 being in the forward rotating status, so that the feed nut 14 is moved to the left, thus moving travelling to the left the subject M which has been placed on the longitudinal feed receiving plate 27 positioned on the transverse feed receiving plate 15 as shown in FIG. 14. At this time, within the cam mechanism 21 the pinion 21c is not engaged with the gear wheel 21d and subsequently the output shaft 21e is not rotated, thus no rotation is imparted to the longitudinal driving screw 25, so that subject M is not moved in the longitudinal direction.

When the feed nut 14 contacts the left-side limit switch 16a, the first rotation reversing mechanism 12 is switched to a reverse rotation mode and the second rotation reversing mechanism 20 is also switched to a reverse rotation mode from a forward rotation mode. The transverse driving screw 13 is then reversely rotated, thus moving the transverse feed nut 14 to the right, and the input shaft 21a in the cam mechanism 21 continues rotating in the same direction, at that time the pinion 21c slightly engages the gear wheel 21d. This engagement causes the output shaft 21e to slightly rotate, thus imparting rotation to the longitudinal driving screw 25. The longitudinal feed receiving plate 27 is then moved in the longitudinal direction, so that the subject M is moved obliquely in the direction of arrow Pa in FIG. 13.

Thereafter, within the cam mechanism 21 the pinion 21c disengages the gear wheel 21d, and, upon completion of the longitudinal feed of subject M, subject M is moved transversely in the direction of arrow Pb in FIG. 13.

When the feed nut 14 then contacts the right-side limit switch 16b, the first and second rotation reversing mechanisms 12 and 20 are switched to a forward rotation mode, and, upon completion of longitudinal feed, the subject M is then moved to the left. Such operation will then be repeated thereafter, thus scanning the subject M wholly.

Operation of the sensitive film moving device will hereinafter be described.

A transverse driving screw 13' is connected to said vertical shaft 18 through bevel gears 28 disposed at the tip thereof. A sensitive film transverse feed receiving plate 15' is fixed to the feed nut 14' which is threadedly mounted to the driving screw 13'. The vertical shaft 18 is further connected to a second rotation reversing mechanism 20' through bevel gears 19' disposed at the tip of the vertical shaft 18, and the second rotation receiving mechanism 20' is then connected to an intermittent transmission cam mechanism 21' similar to that described hereinbefore. Rotation of the output shaft of the cam mechanism 21' is transmitted to a transverse coupling shaft 23' through bevel gears 22' disposed at the tip of the output shaft, and is then transmitted to a longitudinal driving screw 25' through bevel gears 24' disposed at the coupling shaft 23'. A longitudinal feed receiving plate 27' is fixed to a feed nut 26' which is threadedly mounted to the driving screw 25'. A sensitive film is mounted to the longitudinal feed receiving plate 27', which will be moved synchrously with moving of subject M in the opposite direction to the direction of movement of the subject and at a predetermined speed.

The moving direction of the sensitive film F and the subject M per one longitudinal feed may be determined dependent on the dimension of slit, the cam mechanism and the bevel gears into which photographing magnification has been taken into consideration.

In the above described scan-photographing method and apparatus in accordance with the present invention, a three dimensional subject having a depth is projected onto a sensitive film while being scanned through a slit integrally defined with a lens, and all points of the subject are disposed oppositely to those of the sensitive film with respect to the lens and the slit, and the subject and the sensitive film are continuously moved in parallel with and in the opposite direction to each other at predetermined speeds, thereby to produce orthographically projected photographs of the subject at a predetermined reduced scale, thus eliminating composition of conventionally divided negatives and photographic papers. In addition, the subject may be photographed at a predetermined scale, so that the dimensions of the subject on the sensitive film are analogous to those of the actual subject. It is therefore possible to write in dimensions or marks on the negatives or positives developed therefrom, in the case whereby the image of a model on the negatives or positives may be utilized as the drawings for working and/or fitting the model into an existing structure.

Figure 15:
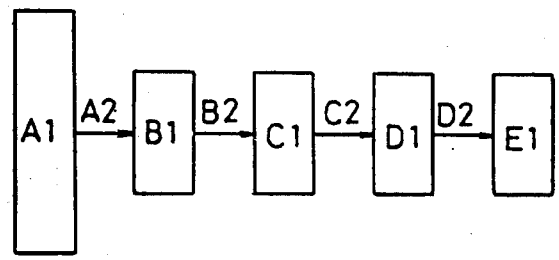
FIG. 15 is an explanatory diagram showing how to practise the present invention.

Description will hereinafter be made regarding how the orthographically projected photographs thus obtained by the scan-photographing apparatus in accordance with the present invention, with reference to FIG. 15 are utilized.

A negative photographed sensitive film B1 obtained by photographing A2 by the scan-photographing apparatus A1, may be developed at B2, and be printed on transparent or translucent sensitive film or paper, thereby to produce a positive plane photograph C1. This plane photograph C1 may be utilized as a basic drawing for preparing a fitting drawing to be used when mounting pipings at a working site. Namely, information on the model equipment, such as dimensions, dimension lines or item names of the equipment, or modification thereof as necessary, may be written in at the process C2 on such positive plane pictures C1, thereby to prepare an original fitting drawing D1. A copy of the original fitting drawing is then taken at the process D2, thus providing a fitting drawing E1 to be used not only as a fitting drawing but also as a machinery space synthetic arrangement drawing.

In conventional designing, the function designing of machinery arrangement drawings or wiring & piping drawings, is made after the basic designing, and detail designing is made thereafter. In detail designing, very complicated drawings are prepared which are referred to as machinery space synthetic arrangement drawings indicating all piping concerned equipment and miscellaneous outfitting equipment, based on the fitting drawing to be used at a working site. Further data for producing piping concerned equipment and micellaneous outfitting equipment have been prepared.

Such conventional drawings for fitting or machinery space synthetic arrangement drawings may be readily prepared from sensitive films photographed by the scan-photographing apparatus in accordance with the present invention, and such sensitive films may be utilized for efficient designing, which has heretofore never existed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of scan-photographing an image of a subject comprising the following steps:

projecting the image of the subject onto a sensitive film through an optical system having a lens and an aperture integrally incorporated therein; and synchronously scan-photographing onto the sensitive film while said subject and said sensitive film are moved along parallel planes at right angles to the optical axis of said lens and in opposite directions to each other with respect to said optical system, said subject and said sensitive film being moved at predetermined speeds thereby producing an orthographically projected photograph of the image of said subject onto said sensitive film.

2. A method as set forth in claim 1, wherein said optical system is formed so that the angle of view at photographing is considerably reduced thereby to produce no effect exerted by the angle of view and the depth of focus is deepened by setting to a predetermined photographing magnification and stop value, and only an image in each of a finely divided portion of said subject is projected through said slit.

3. An apparatus for scan-photographing an image of a subject comprising:

an optical system having a lens and an aperture integrally incorporated therein;

a first moving means for movably positioning said subject in a first plane on one side of said optical system;

second moving means for movably positioning said sensitive film in a second plane, parallel to said first plane, and on the other side of said optical system, whereby the image of said subject is projected onto said sensitive film through said optical system; and means for synchronously moving said first moving means and said second moving means at predetermined speeds within said first and second parallel planes at right angles to the optical axis of the lens and in opposite directions to each other with respect to said optical system.

4. An apparatus for scan-photographing an image of a subject according to claim 3, wherein the subject is a three-dimensional object.

5. An apparatus for scan-photographing an image of a subject according to claim 3, wherein said optical system is a camera and said aperture acts as a slit as the subject and the sensitive film are moved in opposite directions to each other with respect to said optical system.

6. An apparatus for scan-photographing an image of a subject according to claim 3, wherein said aperture is diamond shaped.

7. An apparatus for scan-photographing an image of a subject according to claim 3, wherein said aperture is rectangular shaped.

8. An apparatus for scan-photographing an image of a subject according to claim 3, wherein the image of said subject produced on said sensitive film is a reduced orthographically projected photograph.

9. An apparatus for scan-photographing an image of a subject according to claim 3, wherein said first means for movably positioning said subject in a first plane includes an upper receiving plate movably disposed in the Y direction along a Y-directional rail mounted on a lower receiving plate and a top plate movably disposed in the X direction along an X-directional rail mounted on said upper receiving plate, said upper receiving plate and said top plate on which said subject is positioned are adapted to move in the Y and X directions, respectfully, by rotation of a driving screw driven by a motor.

10. An apparatus for scan-photographing an image of a subject according to claim 3 or 9, wherein said second means for movably positioning said sensitive film in a second plane, parallel to said first plane, includes an upper receiving plate movably disposed in the Y direction along a Y-directional rail mounted on a lower receiving plate and a top plate movably disposed in the X direction along an X-directional rail mounted on said upper receiving plate, said upper receiving plate and said top plate on which said sensitive film is positioned are adapted to move in the Y and X directions, respectively, by rotation of a driving screw driven by a motor.

11. An apparatus for scan-photographing an image of a subject according to claim 3, wherein said means for synchronously moving said first moving means and said second moving means in opposite directions to each other imparts a first motion along a fist coordinate with respect to said optical system to obtain a scan-photograph of a predetermined portion of said subject and subsequently imparts a second motion to said first moving means and said second moving means in opposite directions to each other to move a predetermined distance along a second coordinate, said predetermined distance determined by the width of said aperture and the photographing magnification.

* * * * *